(12) United States Patent
Duncan et al.

(10) Patent No.: US 10,736,435 B2
(45) Date of Patent: Aug. 11, 2020

(54) SEATING SYSTEM AND METHOD FOR PRODUCING SAME (71) Applicant: LEAR CORPORATION, Southfield, MI (US)

(72) Inventors: Bradley C. Duncan, Harrison Township, MI (US); Paul S. Severinski, Brownstown, MI (US); Louella Ann Patterson, Goodells, MI (US); Lisa Townley, Allen Park, MI (US); Kevin W. Peabody, Northville, MI (US); Michelle A. Pereny, Farmington Hills, MI (US); Michael R. Puhalla, Macomb Township, MI (US); Vineetha Mathew, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 35 days.

(21) Appl. No.: 16/033,347

(22) Filed: Jul. 12, 2018

(65) Prior Publication Data
US 2019/0090656 A1 Mar. 28, 2019

Related U.S. Application Data (60) Provisional application No. 62/563,278, filed on Sep. 26, 2017.

(51) Int. Cl.
B60N 2/64 (2006.01)
A47C 31/12 (2006.01)
B60N 2/70 (2006.01)
B60R 21/207 (2006.01)
B60N 2/56 (2006.01)
B60N 2/58 (2006.01)

(52) U.S. Cl.
CPC .............. A47C 31/126 (2013.01); B60N 2/56 (2013.01); B60N 2/5891 (2013.01); B60N 2/64 (2013.01); B60N 2/7017 (2013.01); B60N 2/7094 (2013.01); B60R 21/207 (2013.01); B60N 2205/30 (2013.01)

(58) Field of Classification Search
CPC .......... A47C 31/126; B60N 2/56; B60N 2/64; B60N 2/7017; B60N 2/7094; B60R 21/207
See application file for complete search history.

(56) References Cited

U.S. PATENT DOCUMENTS

| 5,492,662 A | * | 2/1996 | Kargol | A47C 27/122 156/214 |
| 5,944,389 A | * | 8/1999 | Zenba | B60N 2/70 156/78 |
| 6,082,824 A | * | 7/2000 | Chow | A47C 9/002 297/452.56 |
| 6,817,675 B2 | | 11/2004 | Buss et al. | |
| 8,038,222 B2 | | 10/2011 | Lein et al. | |
| 8,882,202 B2 | | 11/2014 | Petzel et al. | |

(Continued)

Primary Examiner — Philip F Gabler
(74) Attorney, Agent, or Firm — Brooks Kushman P.C.

(57) ABSTRACT

A vehicle seating system having a seat part includes a non-foam base material covered with a trim material. The non-foam base material may include a plurality of different firmness zones based at least in part on at least one of a seated-occupant pressure map and a structural arrangement disposed adjacent to the seat part. The seat part may be, for example, a seat cushion, a seat back, or a seat bolster.

16 Claims, 5 Drawing Sheets (56) References Cited

U.S. PATENT DOCUMENTS

| | | |
|---|---|---|
| 9,038,252 B2 | 5/2015 | Ali et al. |
| 2007/0158994 A1* | 7/2007 | Brennan .................. A47C 7/74 297/452.43 |
| 2010/0229606 A1* | 9/2010 | Ikenaga .................. B60N 2/58 66/196 |
| 2015/0175042 A1* | 6/2015 | Galbreath ............ B60N 2/5825 297/452.48 |
| 2016/0206103 A1* | 7/2016 | Zouzal .................. B60N 2/914 |
| 2016/0207429 A1* | 7/2016 | Fitzpatrick ............. B60N 2/646 |

* cited by examiner

SEATING SYSTEM AND METHOD FOR PRODUCING SAME

CROSS-REFERENCE TO RELATED APPLICATIONS

This application claims the benefit of U.S. provisional application Ser. No. 62/563,278 filed Sep. 26, 2017, which is hereby incorporated herein by reference.

TECHNICAL FIELD

The present disclosure relates to a vehicle seating system and a method for producing a vehicle seating system.

BACKGROUND

Vehicle seating systems are required to meet a variety of design specifications, some of which may relate to performance requirements, while others may relate to occupant comfort. Some seating systems use a polymeric foam such as polyurethane as a base material for the seat cushion and seat back, which is then covered by a trim material to enhance aesthetics and comfort. Because the weight of an occupant is not equally distributed over the entire contact area with the seat, different areas of the seat experience different forces when the occupant is seated. Similarly, the occupant experiences different reaction forces in different locations resulting from contact with the seat; this may lead to less than optimal comfort. In addition, a vehicle seat may be a very complex system made up of many different structures—e.g., a seat frame, motors or other mechanical systems for moving the seat, airbags and their associated frame structures, etc. In locations where these structures are in contact with the backside of the foam or other base cushion material, the occupant may experience a higher reaction force, again leading to less than optimal comfort in these locations.

In order to increase comfort and provide other benefits, it would be desirable to control distribution of the forces—and because forces are inevitably distributed over some area, the pressures—experienced by a seated occupant. It would therefore be desirable to have a seating system, and a method for producing such a seating system, that was able to control reaction force, pressure gradients, or both experienced by the seated occupant.

SUMMARY

Embodiments described herein may include a vehicle seating system having a seat part including a non-foam base material covered with a trim material. The non-foam base material may include a plurality of different firmness zones based at least in part on at least one of a seated-occupant pressure map and a structural arrangement disposed adjacent to the seat part.

In some embodiments the seat part may be a seat cushion, a seat back, or a seat bolster. In some embodiments a seating system may include more than one seat part, which may include some combination of a seat cushion, a seat back, and a seat bolster.

In at least some embodiments at least one of the firmness zones may be based on the seated-occupant pressure map and at least one other of the firmness zones may be based on the structural arrangement. The structural arrangement may include at least one of a seat frame, a seat-movement system, an airbag system, or a heater pad.

Embodiments may include a non-foam base material comprising a layer of monofilament fibers and a layer of knit material. In at least some embodiments, the firmness of the different firmness zones may be controlled by controlling at least one of the diameter of the monofilament fibers, the density of the monofilament fibers, or parameters of the knit material, such as the yarn gauge, design or weave structure, etc. In at least some embodiments, the non-foam base material comprises two layers of knit material disposed on opposite sides of a layer of monofilament fibers.

Embodiments may include a vehicle seating system having a seat part including a non-foam base material covered with a trim material. The non-foam base material may include: a first firmness zone positioned at a first predetermined location on the seat part and providing a first firmness, and a second firmness zone positioned at a second predetermined location on the seat part and providing a second firmness greater than the first firmness. Each of the first and second firmness zones may be based at least in part on an expected pressure distribution on a seated occupant.

Embodiments described herein may include a method for producing a vehicle seating system having a seat part with a trim material disposed over a base material. The method may include configuring the base material with a plurality of firmness zones, at least one of the firmness zones having a different firmness than at least one other of the firmness zones. The method may also include locating one of the firmness zones having a first firmness in an area where an expected pressure on a seated occupant is a first pressure, and locating another of the firmness zones having a second firmness greater than the first firmness in an area where an expected pressure on the seated occupant is a second pressure, different from the first pressure. The second firmness zone may be located in an area where the pressure on the seated occupant is less than or greater than the first pressure. This may depend on a number of factors, including where in the seat—e.g., seat back or seat cushion—the base material is used.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
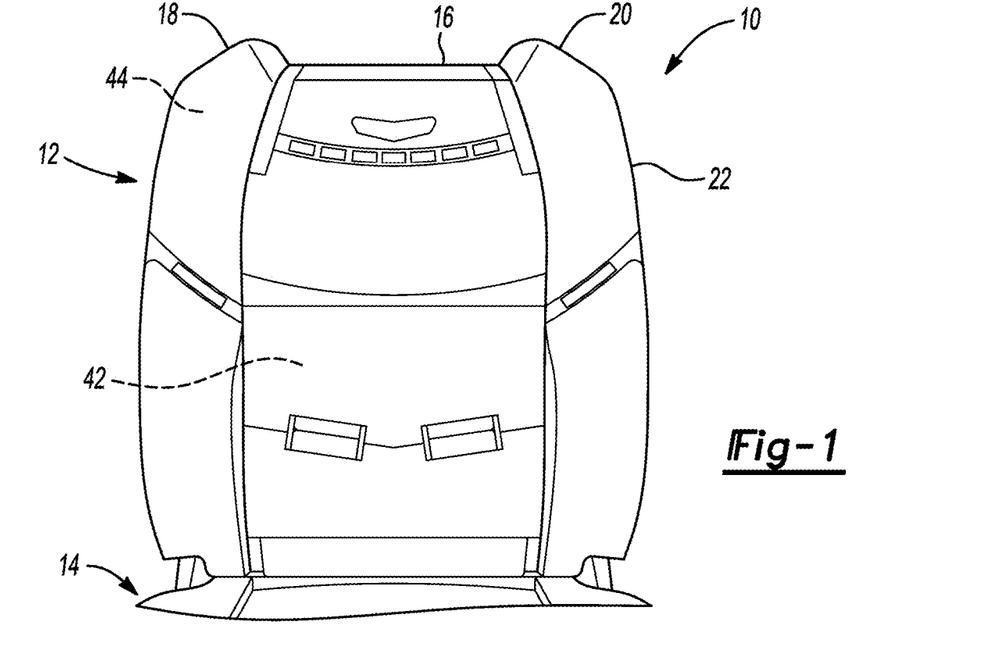
FIG. 1 shows a vehicle seating system including a seat back, in accordance with embodiments described herein.

FIG. 1 shows a seating system 10 in accordance with embodiments described herein. The seating system 10 includes a seat back 12 and a seat cushion 14, only a portion of which is illustrated in FIG. 1. Unless otherwise noted, the term "seat cushion" as used herein is that portion of the seat that is generally horizontal and on which the occupant sits. The seat back 12 includes a center portion 16 and two side bolsters 18, 20. In general, the seat back 12, the seat cushion 14, and the bolsters 18, 20—and bolsters for the seat cushion 14 not separately called-out in FIG. 1—may be referred to as a "seat part" for convenience. Other portions of a seating system, such as the seating system 10, may also be considered a seat part, for example, a head restraint.

As shown in FIG. 1, the seat back 12 is without a trim cover material such that a base material 22 is shown. The base material 22 may be, for example, a polyurethane foam or other material. Although the polyurethane foam 22 may be molded to have a desired firmness, varying the firmness within a single molded piece may be a difficult and uneconomical process. Therefore, as described in more detail below, embodiments described herein may use a different base material, which may be used in conjunction with or as a substitute for the polyurethane foam 22.

Figure 2:
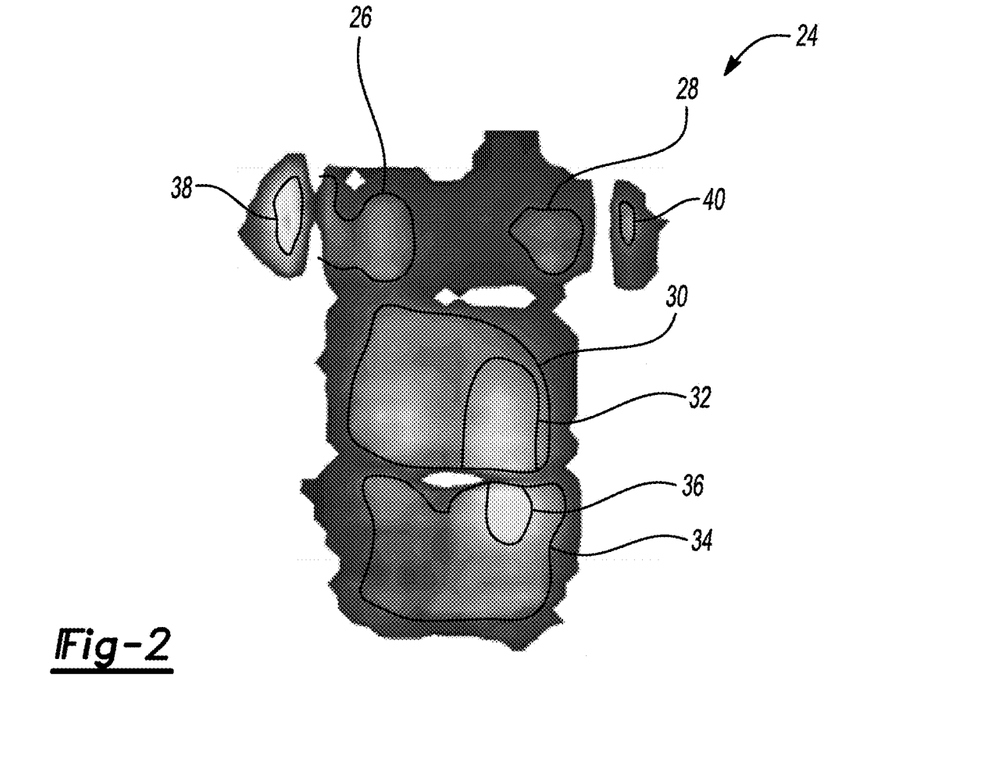
FIG. 2 shows a pressure map for a seat back that can be used in accordance with embodiments described herein.

In order to determine where different levels of firmness should be located, a pressure map can be made to indicate areas of different pressure experienced by a seated occupant. FIG. 2 shows a pressure map 24 for the back of an occupant seated in a seat such as shown in FIG. 1. A number of different pressure regions: 26, 28, 30, 32, 34, 36, 38, 40 are shown. The pressure map 24 may be generated using an actual seated occupant, but for consistency and comparison purposes, it may be preferable to use an artificial representative of a certain occupant demographic, such as a $50^{th}$-percentile or $95^{th}$-percentile dummy. In the pressure map 24, zones 32, 36, 38 are of particularly high pressure. This may be the result of a number of factors, such as how the weight of the occupant is distributed on the seat back 12, the supporting and other structural arrangements of the seat 10, or both.

In one example, the high-pressure regions 32, 34 may result from a greater portion of the occupant's weight being distributed toward that side of the seat, or there may be a structural arrangement, such as a portion of a seat frame, positioned adjacent to—e.g., behind—the seat-back foam 22. Such a seat frame 42 is generally indicated by the dashed line in FIG. 1. The high-pressure area 38 is in the region of right-side bolster 18, and may be, for example, the result of a side airbag system disposed within the bolster 18 as indicated by the dashed line 44 shown in FIG. 1. In general, uneven weight distribution and structural arrangements adjacent to a base material of the seat may result in higher pressures being experienced by the seated occupant.

Figure 3:
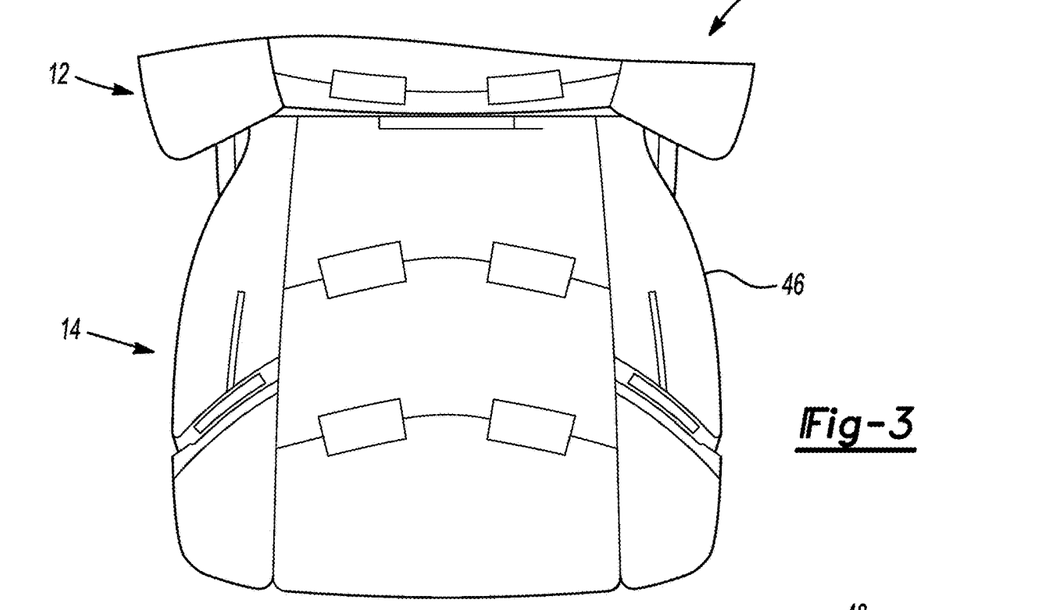
FIG. 3 shows the vehicle seating system from FIG. 1 including a seat cushion.
Figure 4:
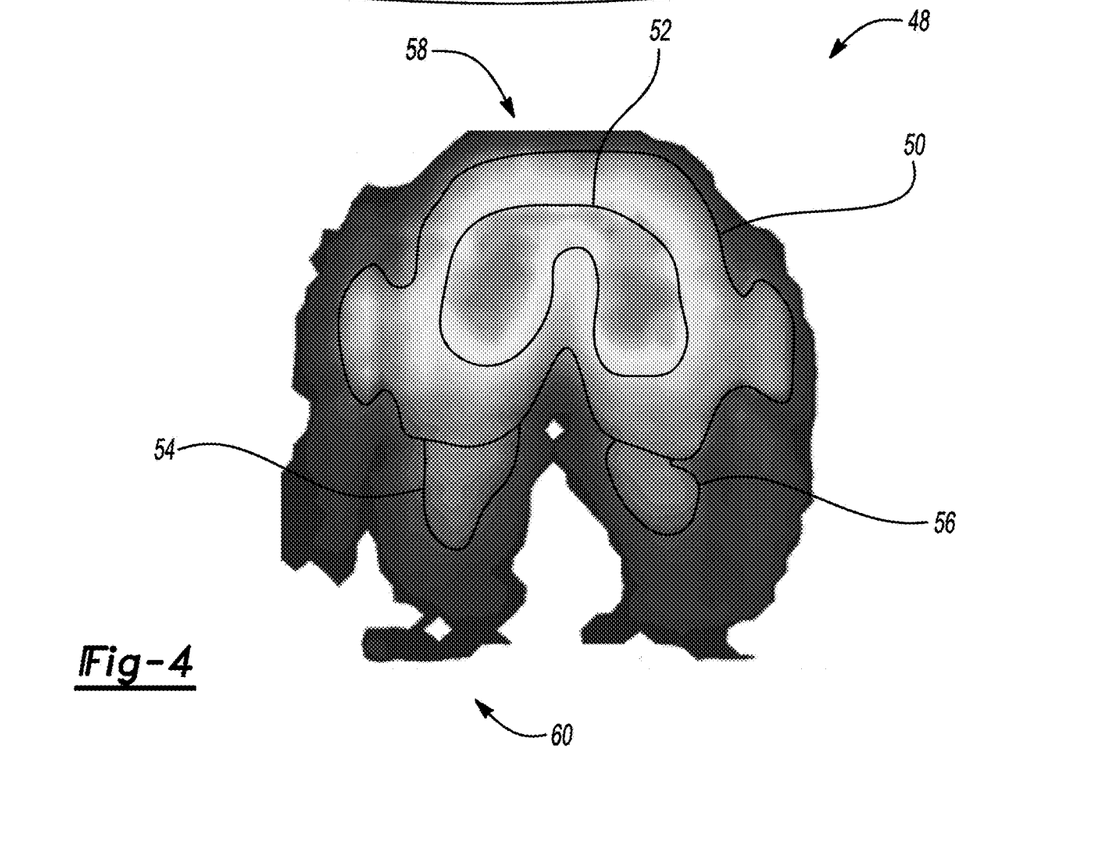
FIG. 4 shows a pressure map for a seat cushion that can be used in accordance with embodiments described herein.

FIG. 3 shows a top-down view of the seat cushion 14, and also shows a portion of the seat back 12 of the seating system 10. Similar to the view shown in FIG. 1, the seat cushion 14 is shown without a trim cover material such that a base material 46—in this case a polyurethane foam—is shown. Similar to the pressure distribution of the seat back 12, the seat cushion 14 can also have a varying pressure distribution, which may be conveniently described in a pressure map, such as the pressure map 48 shown in FIG. 4. The pressure map 48 illustrates a number of different pressure regions: 50, 52, 54, 56. In the pressure map 48, the highest pressure is in the region 52. This may be expected, in that more of the weight of an occupant is focused toward the rear 58 of a seat under the buttocks, and less weight is focused toward the front 60 of a seat under the thighs.

Figure 5:
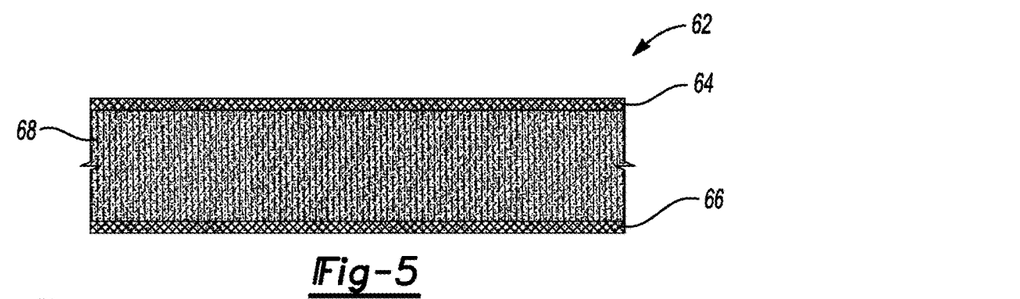
FIG. 5 shows a base material that can be used with vehicle seating systems described herein.

In order to control an undesirable pressure distribution in a seating system, such as the seating system 10, embodiments described herein may use a base material other than, for example, a polyurethane foam. FIG. 5 shows a base material 62 that can be used to control the distribution of pressure over a seated occupant. One way this can be accomplished is to configure the material 62 with different firmness zones corresponding to different pressure regions on the seat. In the embodiment shown in FIG. 5, the material 62 is made up of three layers that are integrated with each other to form a unitary material. More specifically, the layers are integrally attached to one another such that they are not readily separated or otherwise used separately.

As shown in FIG. 5, the material 62 includes first and second layers 64, 66, which surround a third layer 68 disposed between them. Each of the layers 64, 66 is made from a knitted polymeric material, such as polypropylene. More particularly, the layers 64, 66 may be made from knitted monofilament fibers. Similarly, the middle layer 68 may also be made from a polymer, such as polypropylene, but rather than having a knit structure, it is made up of monofilament fibers in a non-knitted structure having at least some of the fibers integrally attached to the knit structures 64, 66. In other embodiments, fibers other than monofilament fibers may be used. The ends of the fibers in the middle layer 68 may be, for example, woven into the knitted layers 64, 66 to form an integrated structure. Using a material, such as the material 62, provides a number of advantages for achieving the desired modification of pressure distribution in the seat.

With some materials it may be very difficult, uneconomical, or both, to vary the firmness within a single integrated material—e.g., polyurethane foam as described above. With other materials, it may be necessary to stack several layers, one upon another to create a layered aggregation that is not an integrated structure. In such a case, the unintegrated layers may move relative to each other causing unintended and undesirable effects, or it may be necessary to use one or more postprocessing steps to attach the layers to each other. As described below, the material 62 can be manufactured with different firmness zones within a single piece of material that is manufactured as a single, integrated structure.

Figure 6:
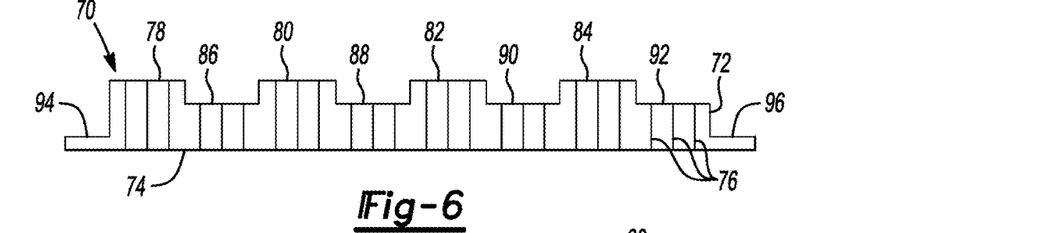
FIG. 6 shows a schematic representation of a configuration of the base material shown in FIG. 5 in accordance with embodiments described herein.

FIG. 6 shows a schematic cross-sectional view of a base material 70 for use in a seating system, such as the seating system 10. The material 70 is configured similarly to the material 62 shown in FIG. 5—i.e., it includes two knit structures 72, 74, which are above and below, and attached to, a plurality of fibers 76, only a few of which are labeled in FIG. 6 for clarity. In the configuration shown in FIG. 6, the fibers 76 have lengths that are oriented generally perpendicular to the knit structures 72, 74. The fibers 76 are longer in certain portions of the material 70, and in particular, they are longer in zones 78, 80, 82, 84.

The additional length of the fibers 76 adds thickness to the material 70 in the zones 78-84, and because of this, the zones 78-84 provide a different firmness—for example, less firm—as compared to the zones where the fibers 76 are shorter—i.e., zones 86, 88, 90, 92. One way to quantify the firmness of a material, such as the material 70, is to use a test wherein an amount of force is applied to a thickness of the material until it has deflected by 50% of its original height. Using a standardized test such as this provides a way to directly compare the firmness of different materials, and even different firmness zones within the same material.

The material 70 is also configured with two sewing flanges 94, 96 shown at either end of the cross section. The sewing flanges 94, 96 may include the top and bottom knit structures 72, 74 with no fibers 76 between them, or a few short fibers may be captured between them. Sewing flanges, such as the flanges 94, 96, may be conveniently disposed along one or more of the edges of the material 70—and even around its entire perimeter—as it is configured and shaped to be a base material for certain portions of a seating system. Other features may also be provided in the material 70, such as drawstring pockets or other added tie-down components.

Figure 7:
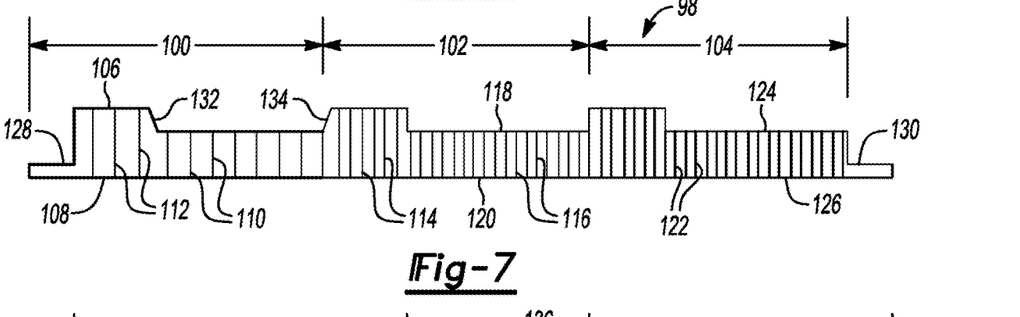
FIG. 7 shows a schematic representation of a configuration of the base material shown in FIG. 5 in accordance with embodiments described herein.

Other ways in which a material, such as the material 62, may be configured to effect a desired pressure distribution in a seat is shown in FIG. 7. In FIG. 7, a cross section of a material 98 is divided into three regions 100, 102, 104. In the region 100, the material 98 includes two knit structures 106 108 capturing a plurality of fibers 110, 112, which may be monofilament or may have other structures. To increase the firmness of the material 98 in the region 100, the thickness of the knit structures 106, 108 has been increased as compared to, for example, the material 70 shown in FIG. 6 and the other regions 102, 104 in the material 98 shown in FIG. 7. This technique has been used in conjunction with varying the length of the fibers such that in the region of the fibers 110, which are shorter than the fibers 112, the material 98 will have a different firmness than in the region of the fibers 112.

The firmness of the material 98 in the region 102 is also varied by including fibers 114, 116 of different lengths. As explained above, this leads to different thicknesses of the material 98 and different firmness values associated with the different fiber lengths. For example, if all other parameters are the same, a shorter fiber may provide a greater firmness as compared to a longer fiber. In the region 102 another technique has been used to increase the firmness of the material 98—i.e., the density of the fibers 114, 116 is greater than, for example, the density of the fibers 110, 112 in the region 100. By more closely packing the fibers 114, 116, the firmness of the material 98 is increased in that region. In the region 102, the knit structures 118, 120 have not been increased in thickness such as shown in the region 100, but these techniques may be combined as desired.

In the region 104, another technique for increasing the firmness of the material 98 is illustrated. Specifically, the fibers 122 are manufactured to have a greater diameter as compared to the fibers described and illustrated above. Similar to the other regions 100, 102, the fibers 122 in the region 104 also vary in length to provide a region of greater thickness to further control firmness, and are captured between two knit structures 124, 126. The cross section of the material 98 shown in FIG. 7 also includes sewing flanges 128, 130 such as described above in conjunction with the material 70. Finally, FIG. 7 also illustrates two transition areas 132, 134 between an area of shorter fibers 110 and areas of longer fibers 112, 114. Such transitions may be integrated into the knit structures, and may provide additional comfort for the seated occupant.

Figure 8:
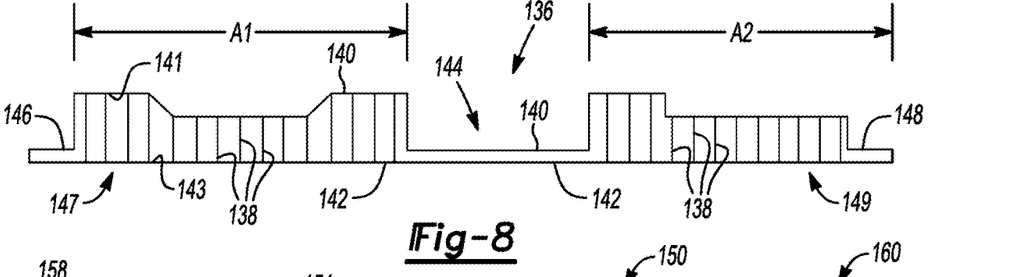
FIG. 8 shows a schematic representation of a configuration of the base material shown in FIG. 5 in accordance with embodiments described herein.

FIG. 8 shows a cross section of a material 136, made up of fibers 138 captured between two knit structures 140, 142. Similar to the materials described above, the material 136 includes fibers of different lengths, which provide different thicknesses and different firmness values along the material. In the cross section illustrated in FIG. 8, the material 136 includes a region 144 having no fibers between the two knit structures 140, 142, which is similar to the sewing flanges 146, 148. In the region 144, the material 136 may provide very little change to the firmness of the seat in which it is used. The material 136 is configured such that a layer 147 of the fibers 138 is attached to and covers an area (A1) of one side 141 of the knit material 140, and also one side 143 of the knit material 142. Similarly, a layer 149 of the fibers 138 is attached to and covers an area (A2) of the one side 141, 143 of each of the knit materials 140, 142, respectively. Even taken together, the two layers 147, 149 of the fibers 138 in this embodiment cover less than an entire area of either of the sides 141, 143 of the respective knit materials 140, 142.

Although, as described above, the thickness of the knit structures can be varied to provide different firmness values even when no fibers are captured between them. This provides the added benefit of using a single piece of base material where more than one piece may otherwise be needed. More specifically, zones of very short or no captured fibers may be used in seam and pattern-breakup areas—i.e., locations that may otherwise require separate pieces of base material to accommodate the very thin cross sections. This reduces the total number of separate pieces of material that are needed, and reduces the complexity of the manufacturing process by eliminating the additional steps needed to attach each of the pieces separately or to each other.

Figure 9:
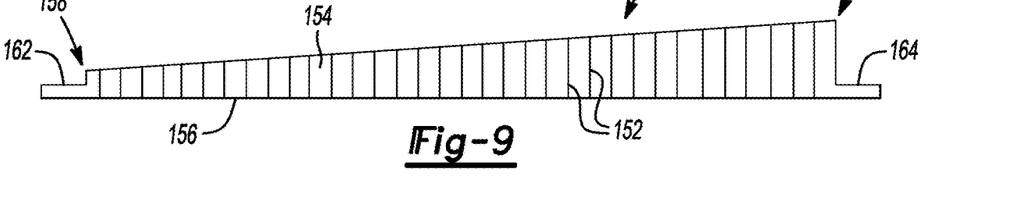
FIG. 9 shows a schematic representation of a configuration of the base material shown in FIG. 5 in accordance with embodiments described herein.

FIG. 9 shows a material 150, which is also made up of fibers 152, which may be monofilament or other fibers, captured between two knit structures 154, 156. As shown in FIG. 9, the material 150 has fibers 152 that gradually increase in length from one end 158 to another end 160. Sewing flanges 162, 164 are also included on the material 150. Unlike the cross sections illustrated in FIGS. 6-8, the material 150 has no distinct regions of firmness; rather, it merely has an increasing thickness from one end 158 to the other end 160. It can be made so that the firmness varies or remains constant between the ends 158, 160. Each of the non-foam materials described above in conjunction with FIGS. 5-9 may be used in conjunction with or as a standalone base material for a seating system, such as the seating system 10 shown in FIG. 1. Although the materials described in conjunction with FIGS. 5-9 each included two knit structures with fibers between them, other configurations are possible. For example, multiple layers of knit structures and fibers may be integrated into a single material, the fibers between the knit structures may be monofilaments or something other than monofilaments, and non-foam materials having different configurations having layers that are not made up of knit structures and fibers as described above may also be used.

When used with another base material, such as a polyurethane foam, the materials 62, 70, 98, 136, 150 may be positioned within a cavity within the foam so that it is, for example, flush with a surface of the foam, disposed somewhat below the surface of the foam, or so that it is positioned above the surface of the foam. These non-foam base materials may also be attached directly to the back of a trim cover material, for example, with a pressure-sensitive adhesive. This may be a convenient form of attachment, for example, if the non-foam material is used without any foam seat padding. The non-foam base materials can be configured with different firmness zones, which may be applied at different locations on a seat back, seat cushion, or bolster. In some embodiments, the non-foam base material may have a finished side that faces outward and is not covered with a trim cover material.

Figure 10:
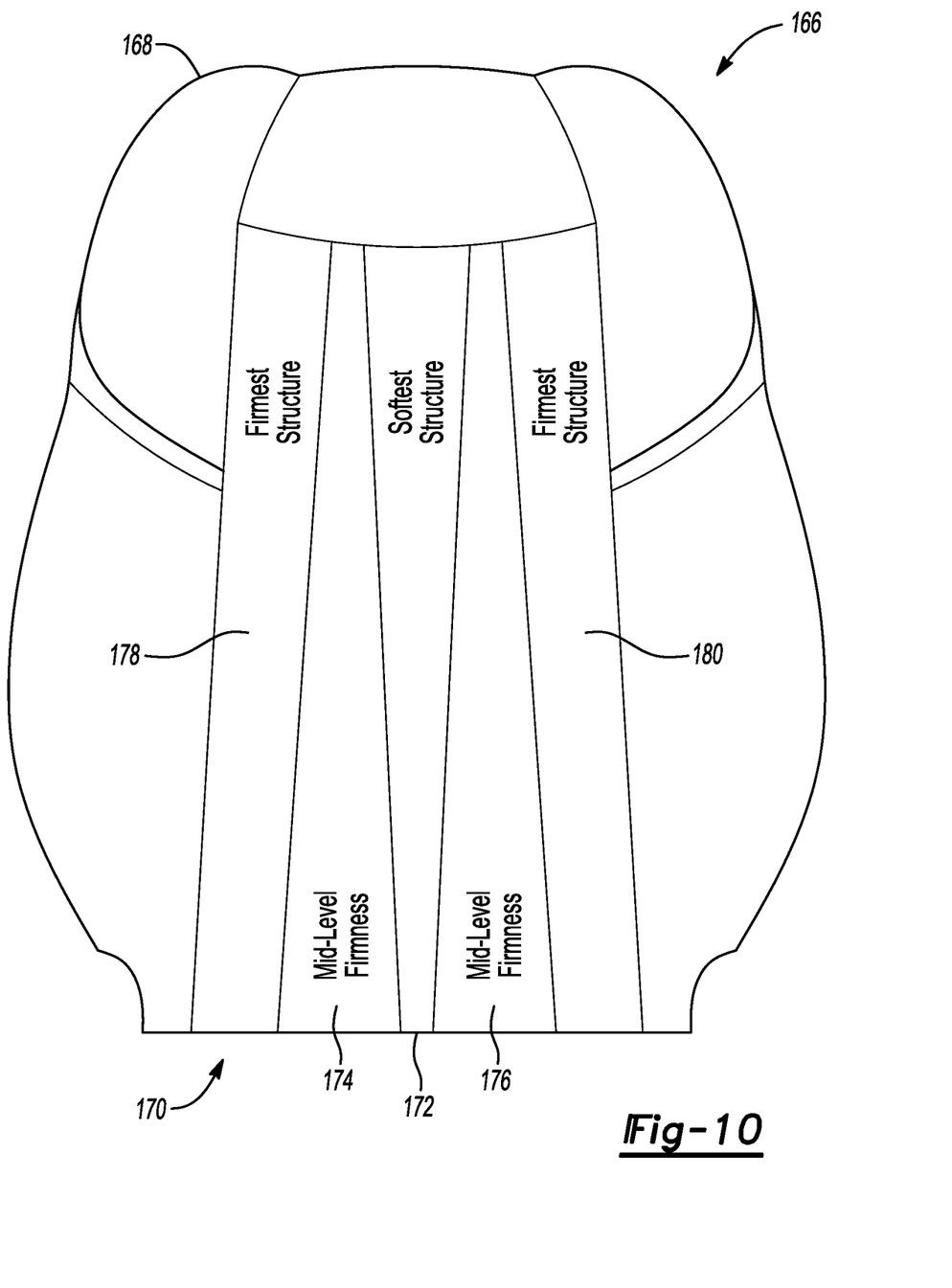
FIG. 10 shows a configuration of a base material for use on a vehicle seat back in accordance with embodiments described herein.
Figure 11:
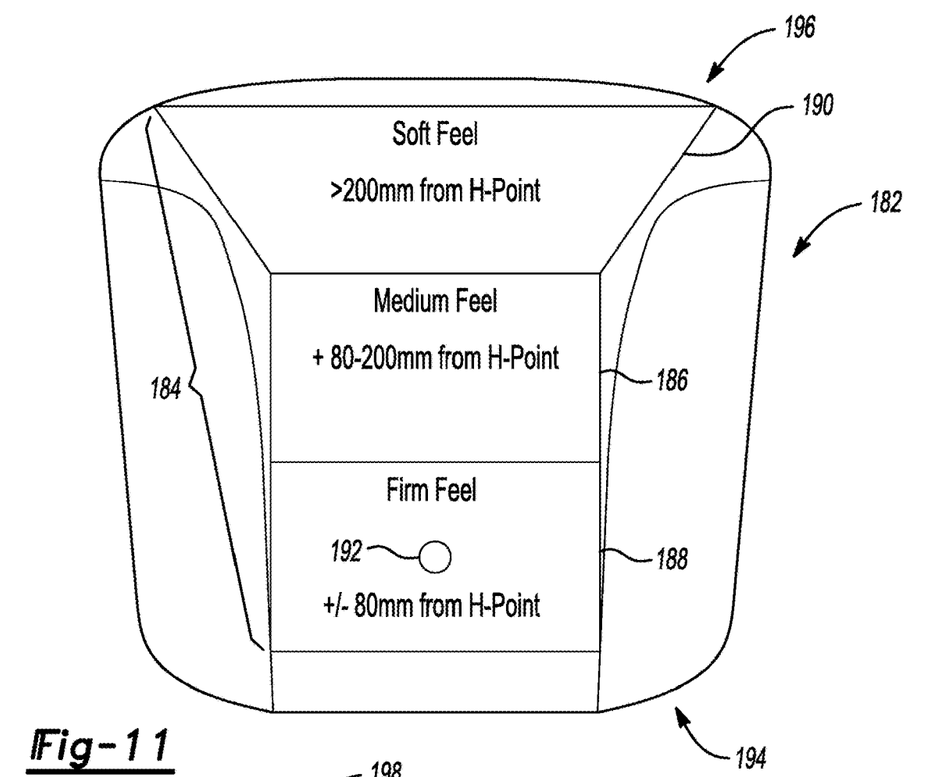
FIG. 11 shows a configuration of a base material for use in a vehicle seat cushion in accordance with embodiments described herein.

In some seat parts—for example, in a seat back—it may be desirable to position zones of relatively high firmness in regions where the pressure map indicates an expected low pressure area for the seated occupant. In a seat back, it may also be desirable to position zones of relatively low firmness in regions where the pressure is expected to be higher on the seated occupant—for example, around the spine. In other seat parts—for example, in a seat cushion—the firmness may be controlled to achieve a different result. More specifically, a base material may be provided with a firmness zone having a high firmness value located in an expected high-pressure area of the seated occupant, and it may be provided with a firmness zone having a low firmness value located in an expected low-pressure area of the seated occupant. As described above, pressure maps maybe based on actual measurements of a seated occupant or a test dummy, but in practice the pressure distribution may vary depending on the particular occupant; therefore, the pressure map may provide expected pressures for an actual seated occupant. FIGS. 10 and 11 illustrate some examples of how these non-foam base materials may be positioned.

FIG. 10 shows a seat part 166, which in this embodiment is a seat back. The seat back 166 is covered with a trim cover material 168, and may, for example, include a base material such as a polyurethane foam underneath it. For purposes of illustration, a configuration of non-foam base material 170 is schematically illustrated on the outside of the trim cover 168. As noted above, the desired locations of zones of different firmness can be determined from a pressure map, such as the pressure map 24 shown in FIG. 2, which provides information related to an expected pressure distribution on a seated occupant. The pressure map 24 represents one specific example of a pressure map for a seated occupant in one particular seat—which may or may not be applicable to another seat or occupant. In general, however, a seated occupant may be expected to experience the greatest pressure along the length of his or her spine, with less pressure on either side moving transversely outward from the spine. Therefore, as shown in FIG. 10, the material 170 is divided into five different firmness zones 172, 174, 176, 178, 180 positioned at predetermined locations in the seat back 166.

A first firmness zone—i.e., the zone 172—is positioned in a central portion of the seat back 166, and extends upward and downward along a length of the seat back—i.e., vertically, or generally vertically, when the seat back 166 is installed in a vehicle. The firmness zone 172 is positioned directly over where an occupant's spine would be expected, and therefore has the least firmness of the five firmness zones. On either side of the zone 172, a more medium firmness is provided in second firmness zones 174, 176, which are positioned laterally adjacent to, and which abut, the first firmness zone 172. Although the pressure on an occupant may not be quite as high in zones 174, 176, there may be other physical landmark features of the occupant—or, as discussed above, structural features of the seat—that weigh in favor of not using the greatest amount of firmness in this region. As shown in FIG. 10, the pieces of the non-foam base material 170 in the zones 174, 176 are generally trapezoidal in shape, with the widest portion of the base being positioned near the base of the seat back 166. Having the zones 174, 176 flare outward in this manner may accommodate a somewhat higher pressure region on the lower part of the occupant's back as opposed to the upper part of the occupant's back. The two outermost zones 178, 180 have the greatest firmness, and are positioned where the lowest pressure regions may be expected for this seat and occupant configuration.

Another way to position various firmness zones on a seat part is to use a H-point position as a reference—this is shown in FIG. 11. In FIG. 11, a seat part 182, which is in this example a seat cushion, is configured with non-foam base material 184 divided into three firmness zones 186, 188, 190. As described above, a different type of firmness control may be used in a seat cushion as compared to a seat back. More specifically, firmness zones having the highest firmness values may be located where a pressure map indicates the pressure on the occupant is highest; the zones of lowest firmness may be located at positions of the lowest pressure. In addition, an H-point—or "hip-point"—may be used as a reference for determining locations for firmness zones.

As shown in FIG. 11, the H-point 192 is identified near the back 194 of the seat cushion 182. A first firmness zone 186 is a positioned at a first predetermined location on the seat cushion 182. In particular, the first firmness zone 186 is defined in this embodiment as being 80-200 mm from the H-point. The first firmness zone 186 is positioned forwardly adjacent to, and may be abutting, a second firmness zone 188. The second firmness zone 188 is positioned at a second predetermined location on the seat cushion 182, and in particular, is defined to be approximately 80 mm fore and aft of the H-point. This may be the area of highest expected pressure according to some pressure maps—see, e.g., FIG. 4—and in this embodiment is also the zone of highest firmness for the material 184. The first firmness zone 186 has a first firmness that is somewhat less firm than a second firmness associated with the second firmness zone 188.

Each of the first two firmness zones 188, 186 is shown as being generally rectangular, but other shapes can be made to accommodate different pressure patterns. In fact, the third firmness zone 190 is generally trapezoidal, flaring outward toward a front 196 of the seat 182. In this embodiment, the firmness of zone 190 is generally defined as being forward from the H-point by at least 200 mm. This is an area where an occupant may experience relatively low pressure—see FIG. 4—and is the zone of lowest firmness. Of course, the positions and dimensions of the various zones may be different for different seats and different target occupants.

Figure 12:
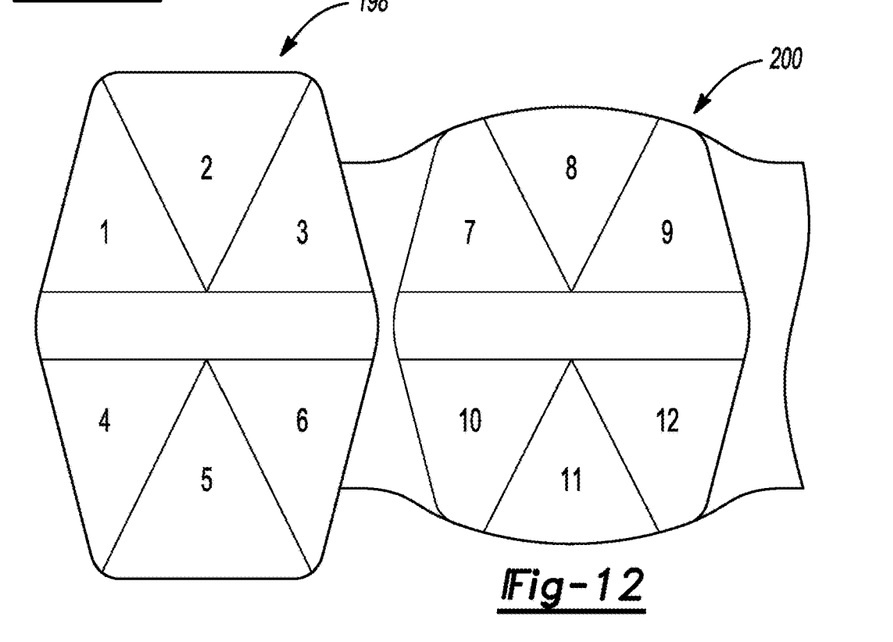
FIG. 12 shows another configuration for a base material for a vehicle seat back and seat cushion in accordance with embodiments described herein.

One example of a more complex firmness zone configuration is illustrated in FIG. 12, which shows a first non-foam base material 198 configured for use in a seat part, such as a seat back, and a second non-foam base material 200 configured for use in a different seat part, such as a seat cushion. Each of the non-foam materials 198, 200 are divided into six separate firmness zones, generally shaped as wedges. With the various ways in which the firmness of a material, such as the materials described above in conjunction with FIGS. 5-9, can be configured, a configuration such as illustrated in FIG. 12 may be realized, although many other configurations—some more simple and some more complex—may also be attained.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seating system comprising:
   a seat part including a non-foam base material covered with a trim material, the non-foam base material including:
   a first firmness zone positioned at a first predetermined location on the seat part and providing a first firmness, and
   a second firmness zone positioned at a second predetermined location on the seat part and providing a second firmness greater than the first firmness, each of the first and second firmness zones being based at least in part on an expected pressure distribution on a seated occupant, and
   wherein the non-foam base material comprises a layer of knit material and a layer of fibers having lengths oriented generally perpendicular to the knit material.

2. The vehicle seating system of claim 1, wherein the expected pressure distribution on the seated occupant is based at least in part on at least one of a seated-occupant pressure map or a structural arrangement disposed adjacent to the seat part.

3. The vehicle seating system of claim 1, wherein the seat part is a seat back, and the first firmness zone is positioned in a central portion of the seat back and extends upward and downward along a length of the seat back, and the second firmness zone is positioned laterally adjacent to the first firmness zone.

4. The vehicle seating system of claim 1, wherein the seat part is a seat cushion, and the second firmness zone contains an H-point of the seat cushion, and the first firmness zone is positioned forwardly adjacent to the second firmness zone.

5. The vehicle seating system of claim 1, wherein the firmness of the first firmness zone and the second firmness zone is controlled by controlling at least one of the thickness of the fibers, the density of the fibers, or the thickness of the knit material.

6. The vehicle seating system of claim 1, wherein the non-foam base material comprises two layers of knit material disposed on opposite sides of the layer of fibers.

7. The vehicle seating system of claim 1, wherein the layer of fibers is attached to and covers an area of one side of the layer of knit material.

8. A vehicle seating system comprising:
   a seat part including a non-foam base material covered with a trim material, the non-foam base material including a plurality of different firmness zones based at least in part on a seated-occupant pressure map, and wherein the non-foam base material comprises a layer of knit material and a layer of fibers having lengths oriented generally perpendicular to the layer of knit material.

9. The vehicle seating system of claim 8, wherein at least one of the firmness zones is based on the seated-occupant pressure map and at least one of the firmness zones is based on a structural arrangement disposed adjacent to the seat part.

10. The vehicle seating system of claim 9, wherein the structural arrangement includes at least one of a seat frame, a seat-movement system, an airbag system, or a heater pad.

11. The vehicle seating system of claim 8, wherein the firmness of the different firmness zones is controlled by controlling at least one of the thickness of the fibers, the density of the fibers, or the thickness of the knit material.

12. The vehicle seating system of claim 8, wherein the non-foam base material comprises two layers of knit material disposed on opposite sides of the layer of fibers.

13. The vehicle seating system of claim 8, wherein the layer of fibers is attached to and covers an area of one side of the layer of knit material.

14. The vehicle seating system of claim 13, wherein the area of the one side of the layer of knit material is less than an entire area of the one side of the knit material.

15. The vehicle seating system of claim 8, wherein the seat part is a seat back, and the different firmness zones include a first firmness zone positioned in a central portion of the seat back extending upward and downward along a length of the seat back, and a second firmness zone positioned laterally adjacent to the first firmness zone and having a firmness greater than the first firmness zone.

16. The vehicle seating system of claim 8, wherein the seat part is a seat cushion, and the different firmness zones include a second firmness zone containing an H-point of the seat cushion, and a first firmness zone positioned forwardly adjacent to the second firmness zone and having a firmness less than the second firmness zone.

* * * * *